United States Patent
Eder et al.

(10) Patent No.: US 11,537,652 B2
(45) Date of Patent: *Dec. 27, 2022

(54) SHARING FILESYSTEMS BETWEEN CONTAINERS

(71) Applicant: Red Hat, Inc., Raleigh, NC (US)

(72) Inventors: Jeremy Eder, Garner, NC (US); Eric Sandeen, Saint Paul, MN (US); Daniel Walsh, Lowell, MA (US); Vivek Goyal, Westford, MA (US)

(73) Assignee: RED HAT, INC., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/141,261

(22) Filed: Jan. 5, 2021

(65) Prior Publication Data

US 2021/0124773 A1    Apr. 29, 2021

Related U.S. Application Data (63) Continuation of application No. 15/627,539, filed on Jun. 20, 2017, now Pat. No. 10,909,165.

(51) Int. Cl.
*G06F 16/51* (2019.01)
*G06F 16/13* (2019.01)
*G06F 16/176* (2019.01)

(52) U.S. Cl.
CPC ............ *G06F 16/51* (2019.01); *G06F 16/13* (2019.01); *G06F 16/176* (2019.01)

(58) Field of Classification Search
CPC ......... G06F 16/51; G06F 16/176; G06F 16/13
See application file for complete search history.

(56) References Cited

U.S. PATENT DOCUMENTS

| 7,904,492 B2 | 3/2011 | Sarma et al. |
| 9,047,309 B1 * | 6/2015 | Pawar ................. G06F 16/1824 |

(Continued)

FOREIGN PATENT DOCUMENTS

| CN | 105117268 A | 2/2015 |
| CN | 104468712 A | 3/2015 |
| TW | 200923642 A | 6/2009 |

OTHER PUBLICATIONS

"Sharing Mounts with a Container," Sep. 22, 2011, https://s3hh.wordpress.com/2011/09/22/sharing-mounts-with-a-container/.

(Continued)

*Primary Examiner* — Alford W Kindred
*Assistant Examiner* — Lin Lin M Htay
(74) *Attorney, Agent, or Firm* — Kilpatrick Townsend & Stockton LLP (57) ABSTRACT

A filesystem can be shared between containers. For example, a computing device having a host filesystem can launch a first container from an image file. Launching the first container can include creating an initialization directory for the first container on the host filesystem. The initialization directory can include a filesystem to be shared between containers. Launching the first container can also include creating a first filesystem directory for the first container on the host filesystem and mounting the initialization directory to the first filesystem directory. The computing device can also launch a second container from the image file. Launching the second container can include creating a second filesystem directory for the second container on the host filesystem and mounting the initialization directory to the second filesystem directory to enable the second container to access the filesystem.

17 Claims, 6 Drawing Sheets

(56) References Cited

U.S. PATENT DOCUMENTS

| | | | |
|---|---|---|---|
| 8,970,884 B2 | 7/2015 | Tsuji et al. | |
| 9,075,638 B2 | 7/2015 | Barnett et al. | |
| 9,256,467 B1 | 2/2016 | Singh et al. | |
| 2007/0198714 A1* | 8/2007 | Faden | G06F 21/6236 709/225 |
| 2009/0271472 A1* | 10/2009 | Scheitler | G06F 9/485 709/202 |
| 2012/0233282 A1* | 9/2012 | Voccio | G06F 11/14 709/212 |
| 2014/0115580 A1* | 4/2014 | Kellerman | H04N 21/4437 718/1 |
| 2017/0083541 A1* | 3/2017 | Mann | G06F 16/119 |
| 2017/0180346 A1 | 6/2017 | Suarez et al. | |

OTHER PUBLICATIONS

"Understand Images, Containers, and Storage Drivers," https://docs.docker.com/engine/userguide/storagedriver/imagesandcontainers/.

"Allowed to Start Multiple Containers on the Same Host Using the Same Public Port," Mar. 11, 2015, https://github.com/rancher/rancher/issues/182.

\* cited by examiner

SHARING FILESYSTEMS BETWEEN CONTAINERS

REFERENCE TO RELATED APPLICATION

This is a continuation of co-pending U.S. patent application Ser. No. 15/627,539, titled "Sharing Filesystems Between Containers" and filed on Jun. 20, 2017, the entirety of which is hereby incorporated by reference.

TECHNICAL FIELD

The present disclosure relates generally to computer resource allocation. More specifically, but not by way of limitation, this disclosure relates to sharing filesystems between containers.

BACKGROUND

Computers use operating systems to manage system processes and resources. Some operating systems, such as the Linux operating system, include a low-level software component for managing system processes and resources. The low-level software component is called a "kernel." The kernel can provide features, such as namespaces and cgroups, for isolating processes and resources from one another. These features can be used to segregate processes and resources (e.g., filesystems, memory, CPU processing power, and network resources) into isolated virtual environments called "containers."

An operating system can run multiple containers simultaneously. The containers can be configured so that processes and resources in one container are isolated from (e.g., private and inaccessible to) another container. This isolation can be useful to, for example, enable the containers to run applications at the same time, without the applications interfering with one another.

DETAILED DESCRIPTION

There can be disadvantages to one container's resources being completely isolated from another container. For example, a kernel may have to create separate filesystems for each container to accomplish complete isolation. But creating separate filesystems for each container can (i) reduce the speed with which the kernel can launch the containers; (ii) reduce the total number of containers that the kernel can launch; (iii) increase memory usage, such as usage of a page cache; (iv) increase the startup time of the containers; and (v) increase the amount of disk accesses (e.g., hard disk reads and writes) required to launch the containers.

Some examples of the present disclosure can overcome one or more of the abovementioned issues by sharing a container's filesystem with one or more other containers. For example, a first container can be launched (e.g., instantiated) from an image file. The first container can have a root filesystem. A root filesystem can be a base filesystem to which other filesystems can be mounted (e.g., associated such that the other filesystems act as subdirectories in the root filesystem). After launching the first container, additional containers can be launched from the same image file such that the additional containers share the existing root filesystem of the first container. Sharing the root filesystem between the containers can result in the kernel being able to launch more containers, at higher speeds, while consuming less memory, than may otherwise be possible. For example, the kernel may be able to launch the additional containers between 25% and 250% faster than is otherwise possible. As another example, the kernel may be able to launch the additional containers while consuming $\frac{1}{5}^{th}$ of the amount of memory in a page cache than would otherwise be consumed. As still another example, the kernel may be able to launch the additional containers without performing any additional disk accesses. Some or all of these features can enable more containers to be run at higher speeds on a single host-device.

In some examples, the root filesystem of the first container is shared with the additional containers by creating a single initialization layer (or "init layer") or a single initialization directory for the image file, and then sharing the initialization layer or the initialization directory among the containers. This may be unlike other approaches, in which a separate initialization layer or a separate initialization directory is created for each individual container.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
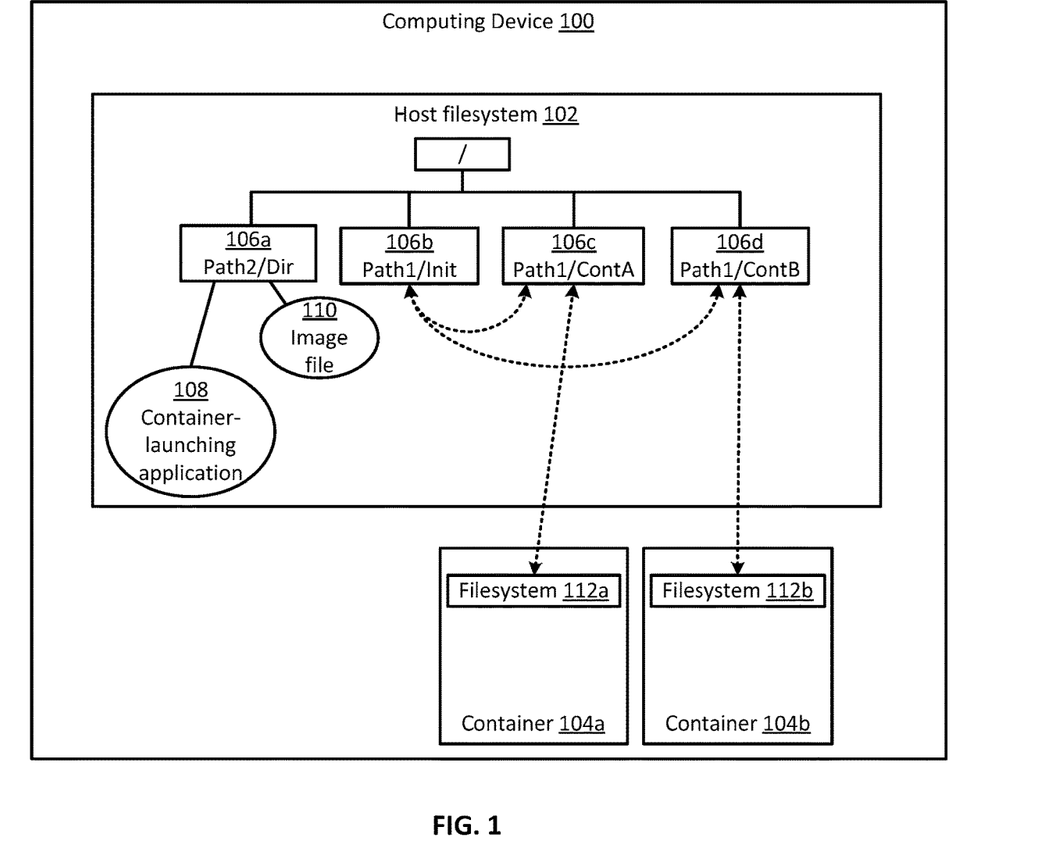
FIG. 1 is a block diagram of an example of a computing device that includes a host filesystem and containers according to some aspects.

FIG. 1 is a block diagram of an example of a computing device 100 that includes a host filesystem 102 and containers 104*a-b* according to some aspects. The computing device 100 can include a laptop computer, desktop computer, server, node in a cluster of nodes, or any combination of these. The computing device 100 can execute an instance of an operating system, such as a Linux operating system, which can form a host environment that includes the host filesystem 102 and the containers 104*a-b*.

The host filesystem 102 includes directories and files. In the example shown in FIG. 1, the host filesystem 102 is represented as a tree structure showing a hierarchy of directories 106*a-d* and files. The files include an image file 110 and a container-launching application 108 for creating or launching the containers 104*a-b* from the image file 110. An example of the container-launching application 108 can be Docker™.

The container-launching application 108 can launch container 104*a* from the image file 110. As part of the process for launching the container 104*a*, the container-launching application 108 can generate an init directory 106*b* at a path in the host filesystem 102. In one examples, the init directory 106*b* can be located at "/var/lib/docker/devicemapper/mnt/<container-ID>-init," where <container-ID> is an identifier of the container 104*a*. The init directory 106*b* can be an initialization directory that can include various files, directories, and other data for initializing and preparing the container 104a. The init directory 106b can serve as a root filesystem for the container 104. In some examples, the init directory 106b can be created by taking a snapshot of the top layer of the image file 110 and mounting the snapshot at the init directory 106b. As part of the process for launching the container 104a, the container-launching application 108 can also generate a filesystem directory 106c for the container 104a at a path in the host filesystem 102. An example of the path to the filesystem directory 106c can be "/var/lib/docker/devicemapper/mnt/ContA." The filesystem directory 106c can serve as the location on the host filesystem 102 for the contents of the container's filesystem 112a, such as the container's root filesystem. The container-launching application 108 can then mount (e.g., read-only bind mount) the init directory 106b to the filesystem directory 106c, thereby linking these two directories together such that the contents of one directory are mirrored in the other directory. This is represented by a dashed arrow between the filesystem directory 106c and the init directory 106b in FIG. 1. In one example, the container-launching application 108 can issue the command "mount --bind Path1/Init Path1/ContA" to mount the init directory 106b to the filesystem directory 106c. After linking the two directories together, container 104a may be ready for use.

In some examples, the container-launching application 108 can configure subsequent containers launched from the image file 110 to effectively share the same root filesystem as container 104a. For example, the container-launching application 108 can launch container 104b from the image file 110. Traditionally, to launch the container 104b, the container-launching application 108 would (i) generate a new, separate init directory that is dedicated to the container 104b; (ii) prepare this separate init directory using the image file 110; (iii) generate a new, separate filesystem directory that is dedicated to a root filesystem of the container 104b; and (iv) prepare this separate filesystem directory using the init directory created in step (ii). The preparation in step (ii) may vary based on the driver used; for example, with a devicemapper driver, a snapshot of an image device can be taken and mounted on the init directory. The preparation in step (iv) can also vary based on the driver used; for example, with the devicemapper driver, a snapshot can be taken from an -init thin device and mounted on the filesystem directory. But this traditional process can be slow and consume memory and computing resources. In some examples of the present disclosure, the container-launching application 108 can launch container 104b by generating the filesystem directory 106d to serve as a location on the host filesystem 102 for the filesystem 112b of the container 104a. The container-launching application 108 can then mount the existing init directory 106b to the filesystem directory 106d, thereby linking these two directories together such that the contents of one directory are mirrored in the other directory. This is represented by a dashed arrow between the filesystem directory 106d and the init directory 106b in FIG. 1. As a result of mounting the existing init directory 106b to the filesystem directory 106d, both of the containers 104a-b can share the same init directory 106b and thus the same root filesystem. In an alternative example, the container-launching application 108 can mount the filesystem directory 106d to the filesystem directory 106c, which in turn is mounted to the existing init directory 106b, achieving substantially the same effect (i.e., that both of the containers 104a-b can share the same init directory 106b and thus the same root filesystem).

In some examples, it may be impractical to share a root filesystem among containers 104a-b when the containers are capable of writing to the root filesystem. For example, if multiple containers 104a-b write to the same root filesystem at the same time, write collision may occur, which may cause partial or incomplete data to be written. In such examples, the container-launching application 108 may only configure the containers 104a-b to share a root filesystem if the containers 104a-b are read-only containers that are capable of reading from, but not writing to, the root filesystem. This can help prevent write collision and other write errors.

Although the above examples relate to sharing a root filesystem between the containers 104a-b, the container-launching application 108 can configure any number, type, and combination of containers 104a-b to share any number, type, and combination of filesystems. Also, although the init directory 106b and the filesystem directories 106c-d are shown in FIG. 1 as being located at the same path (Path1) in the host filesystem 102, these directories can be located at any suitable location(s) on the host filesystem 102. Likewise, the container-launching application 108 and the image file 110 can be located at any suitable location(s) on the host filesystem 102.

In some examples, the container-launching application 108 can share a filesystem between containers 104a-b at least in part by configuring the containers 104a-b to share one or more virtual layers, as discussed in greater detail below with respect to FIG. 2.

Figure 2:
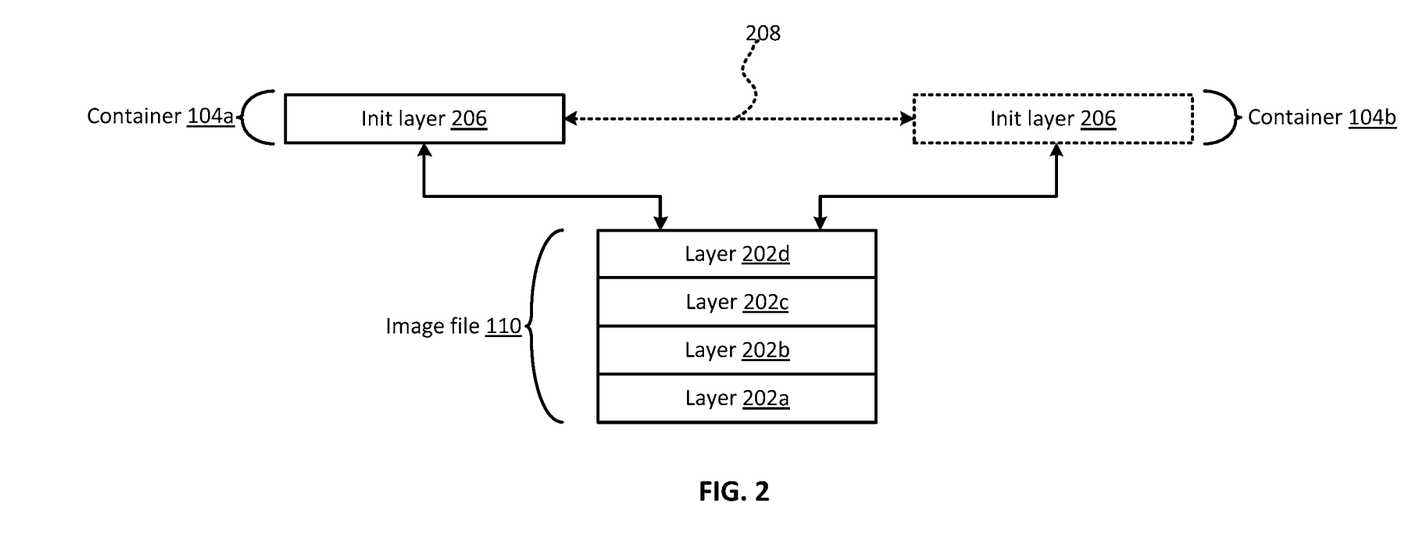
FIG. 2 is a block diagram of an example of an image file and containers according to some aspects.

Turning now to FIG. 2, the image file 110 can be represented as one or more layers 202a-d of content that collectively define the characteristics of the containers launched from the image file 110. Each layer 202a-d can add a feature (e.g., operating system, application, or file) to the container, or modify an existing feature of the container provided by a previous layer 202a-d. For example, layer 202a can include an operating-system layer. The operating-system layer can include a Linux-based operating system, such as a Red Hat™ Linux operating system. The operating-system layer can provide the operating system that runs in the containers 104a-b. As another example, layer 202b can be an emacs layer. The emacs layer can provide one or more text editors that are executable within the containers 104a-b. As still another example, layer 202c can be a webserver layer. The webserver layer can provide a webserver, such as Apache™, that is executable within the containers 104a-b. As another example, layer 202d can include a security layer. The security layer can modify a file of the webserver layer to include a security patch, thereby making the webserver more secure from malicious attacks. The image file 110 can include any number, combination, and configuration of layers 202a-d for defining the characteristics of the containers launched from the image file 110.

The container-launching application 108 can launch two or more containers 104a-b from the image file 110. Launching the containers 104a-b can include generating one or more virtual layers that "sit on top of" the existing layers 202a-d of the image file 106. The virtual layers can include configuration information for the containers 104a-b, copies or modified versions of files from the layers 202a-d, or any combination of these. One example of such a virtual layer is the init layer 206, which may include configuration and initialization information for the container 104a.

Typically, separate virtual layers are created for each container 104a-b. For example, one init layer would be created for container 104a and a separate init layer would be created for container 104b. But some examples of the present disclosure enable the containers 104a-b to share one or more of the virtual layers.

For example, the container-launching application 108 can create the init layer 206 while launching container 104a. If the container-launching application 108 is then commanded to launch another container from the image file 106, the container-launching application 108 can determine whether there is an existing init layer that can be used, such as init layer 206 of container 104a. If so, the container-launching application 108 can launch another container 104b using the existing init layer 206. This can reduce the amount of time and memory required to launch the other container 104b. After launching container 104b, both of the containers 104a-b can share the init layer 206, as represented by the dashed arrow 208.

Other examples of the present disclosure may lack an init layer 206. In such examples, the containers 104a-b can share the top layer of the image file, such layer 202d. This may enable the containers 104a-b to share a root filesystem or other content.

Figure 3:
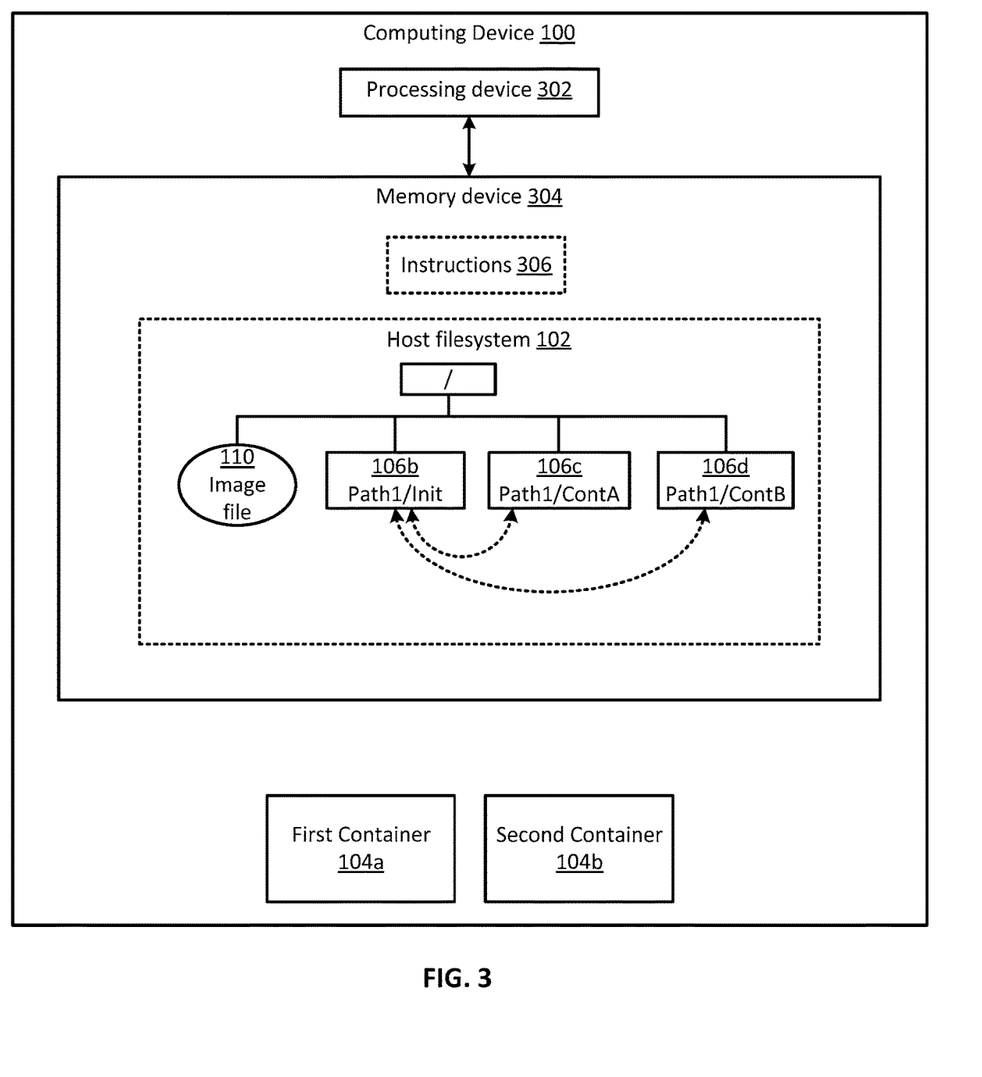
FIG. 3 is a block diagram of an example of a computing device according to some aspects.

A more specific example of the computing device 100 of FIG. 1 is shown in FIG. 3. The computing device 100 includes a processing device 302 communicatively coupled to a memory device 304. The processing device 302 can include one processing device or multiple processing devices. Non-limiting examples of the processing device 302 include a Field-Programmable Gate Array (FPGA), an application-specific integrated circuit (ASIC), a microprocessor, etc.

The processing device 302 can execute one or more operations for sharing resources between containers. The processing device 302 can execute instructions 306 stored in the memory device 304 to perform the operations. In some examples, the instructions can include processor-specific instructions generated by a compiler or an interpreter from code written in any suitable computer-programming language, such as C, C++, C#, etc.

Memory device 304 can include one memory device or multiple memory devices. The memory device 304 can be non-volatile and may include any type of memory device that retains stored information when powered off. Non-limiting examples of the memory device 304 include electrically erasable and programmable read-only memory (EEPROM), flash memory, or any other type of non-volatile memory. In some examples, at least some of the memory device can include a medium from which the processing device 302 can read instructions 306. A computer-readable medium can include electronic, optical, magnetic, or other storage devices capable of providing the processing device with computer-readable instructions 306 or other program code. Non-limiting examples of a computer-readable medium include magnetic disk(s), memory chip(s), ROM, random-access memory (RAM), an ASIC, a configured processor, optical storage, or any other medium from which a computer processor can read instructions 306.

The memory device 304 also includes a host filesystem 102 having files and directories, such as the image file 110, the init directory 106b, and the filesystem directories 106c-d. The computing device 100 can use the image file 110 to launch the first container 104a and the second container 104b. In some examples, the computing device 100 can cause the containers 104a-b to share a filesystem, such as a root filesystem, by mounting the init directory 106b to the filesystem directories 106c-d for the containers 104a-b.

Figure 4:
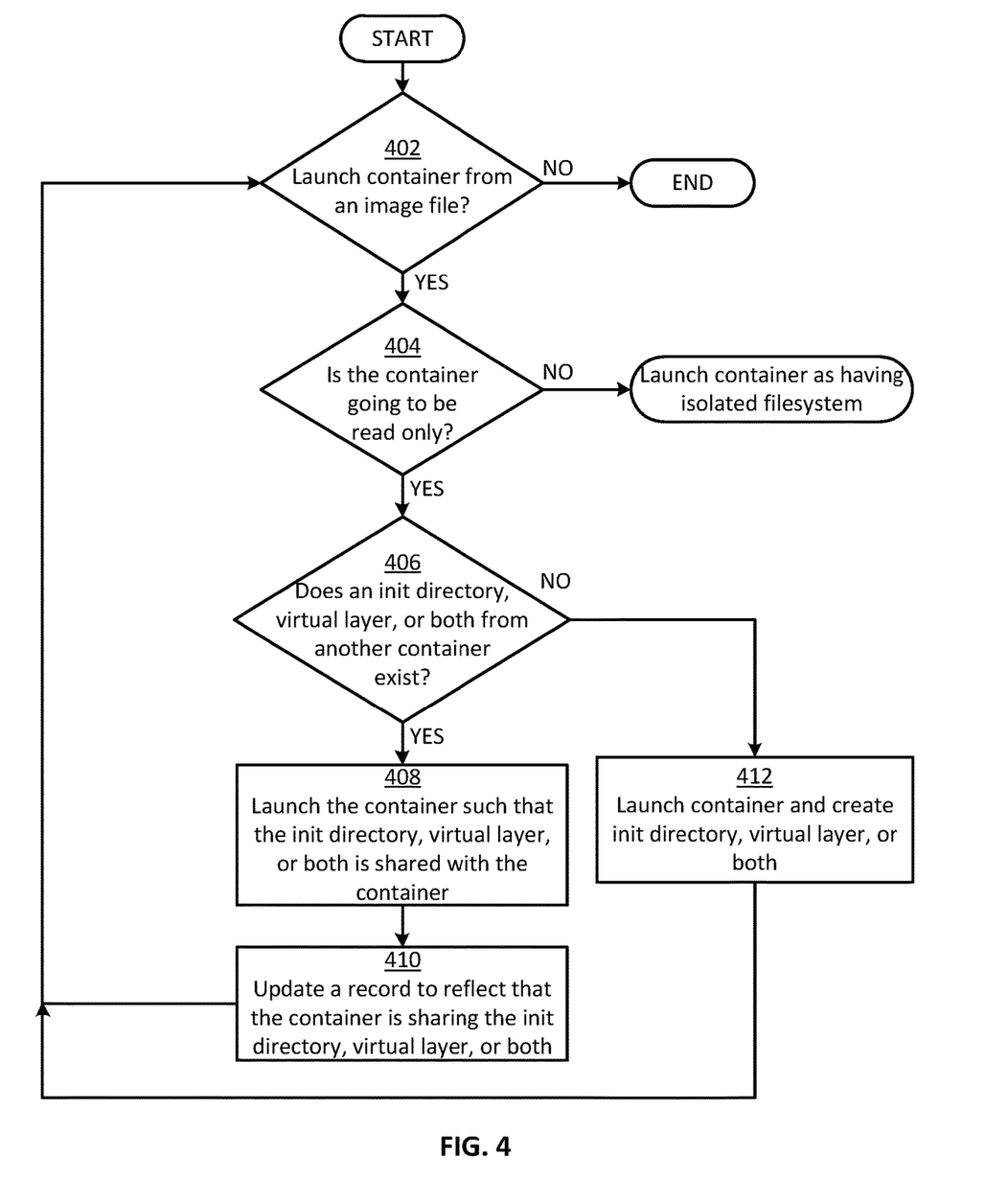
FIG. 4 is a flow chart of an example of a process for sharing filesystems between containers according to some aspects.

In some examples, the computing device 100 can implement some or all of the steps shown in FIG. 4 to share filesystems between containers. In other examples, the computing device 100 can implement more steps, fewer steps, different steps, or a different order of the steps depicted in FIG. 4. The steps of FIG. 4 are described with reference to components discussed above.

In block 402, the computing device 100 determines if a container is to be launched from an image file 110. For example, the computing device 100 can determine if a command or user input has been received indicating that the container-launching application 108 is to launch a container from the image file 110. If the container is to be launched from the image file 110, then the process can proceed to block 404. Otherwise, the process may end.

In block 404, the computing device 100 determines if the container is to be a read-only container that is capable of reading from, but not writing to, a filesystem of the container. For example, the computing device 100 can analyze the command or user input received in block 402 to determine if a flag is set designating the container as read-only. If the container is to be read only, the process can proceed to block 406. Otherwise, the computing device 100 can launch the container with its own designated filesystem, which is isolated from other containers launched from the image file 110.

In block 406, the computing device 100 determines if an init directory, a virtual layer, or both that is to be shared with the container already exists (e.g., if the init directory or virtual layer was previously created for another container). For example, the computing device 100 can determine if the init directory 106b or the init layer 206 for another container already exists. If the init directory, the virtual layer, or both does not exist, then the process can proceed to block 412, where the computing device 100 launches the container and creates the init directory, the virtual layer, or both, which can be shared with subsequent containers.

If the virtual layer does exist, the process can proceed to block 408, where the computing device 100 launches the container such that the init directory, the virtual layer, or both is shared with the container. For example, the computing device 100 can bind mount the existing init directory (e.g., init directory 106b) to a filesystem directory (e.g., filesystem directory 106d) of the container.

In block 410, the computing device 100 updates a record to reflect that the container is sharing the init directory, the virtual layer, or both. For example, the computing device 100 can include a database that relates containers to init directories or virtual layers that the containers are sharing. The computing device 100 can insert information into the database indicating that the container is sharing the init directory or the virtual layer.

Figure 5:
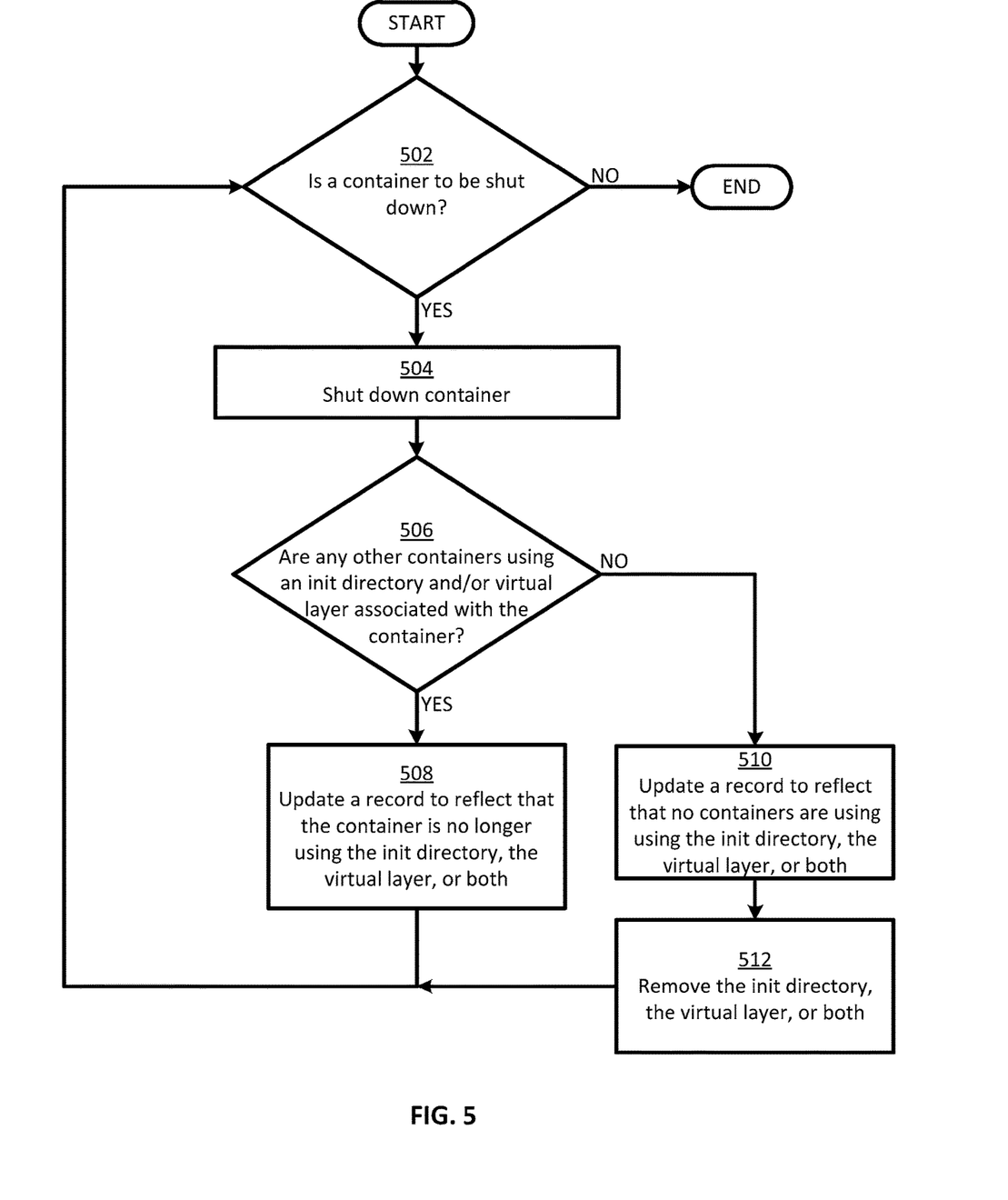
FIG. 5 is a flow chart of another example of a process for shutting down containers according to some aspects.

In some examples, the computing device 100 will shut down containers periodically (e.g., after a container is done performing a task or is otherwise no longer needed). The computing device 100 can update the record to reflect that a container has been shut down or is otherwise no longer using a particular init directory, virtual layer, or both. The computing device 100 can also check the record to determine if there are any containers left that are still sharing the particular init directory, virtual layer, or both. If not, the computing device 100 can remove the init directory, virtual layer, or both. The record can help prevent init directories and virtual layers that are still in use from being inadvertently removed. An example of this process is shown in FIG. 5, and described in greater detail below. But in other examples, the computing device 100 can implement more steps, fewer steps, different steps, or a different order of the steps depicted in FIG. 5.

In block 502, the computing device 100 determines if a container is to be shut down. If not, the process can end. Otherwise, the process can proceed to block 504, where the computing device 100 can shut down the container.

In block 506, the computing device 100 can determine if any other containers are using an init directory, a virtual layer, or both that is associated with the container. For example, the computing device 100 can access a record that that relates containers to specific init directories, virtual layers, or both. The computing device 100 can use the record to identify a particular init directory, virtual layer, or both that corresponds to (e.g., that was being used by) the container. The computing device 100 can also use the record to determine whether any other containers are using the particular init directory, virtual layer, or both.

If there are other containers that are using the particular init directory, virtual layer, or both, then the process can proceed to block 508, where the computing device 100 can update the record to reflect that the container is no longer using the init directory, the virtual layer, or both. For example, the computing device 100 can update an entry in the record (related to the particular init directory, virtual layer, or both) to indicate that the container is no longer using the init directory, virtual layer, or both.

If there are no other containers that are using the particular init directory, virtual layer, or both, then the process can proceed to block 510, where the computing device 100 can update the record to reflect that there are no containers using the init directory, the virtual layer, or both. For example, the computing device 100 can delete an entry in the record related to the particular init directory, virtual layer, or both. The computing device 100 may additionally or alternatively remove the init directory, the virtual layer, or both (e.g., as shown in block 512).

Figure 6:
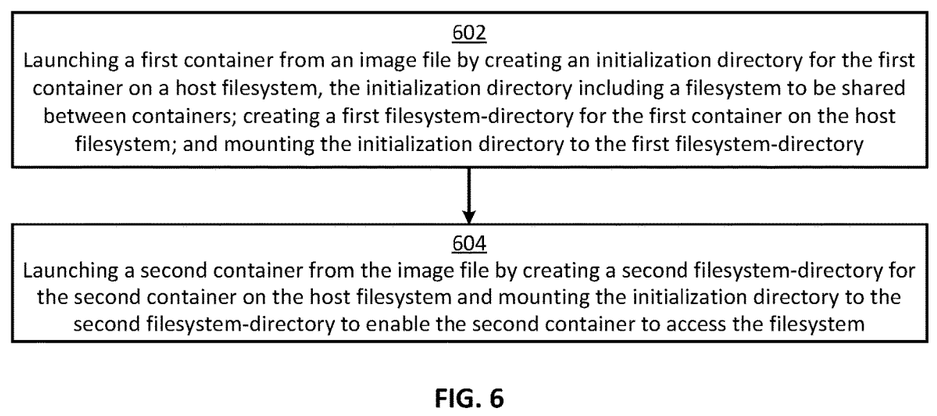
FIG. 6 is a flow chart of another example of a process for sharing filesystems between containers according to some aspects.

FIG. 6 is a flow chart of another example of a process for sharing filesystems between containers according to some aspects. Other examples can include more steps, fewer steps, different steps, or a different order of the steps described with respect to FIG. 6. The steps of FIG. 6 are described with reference to components discussed above.

In block 602, a computing device 100 launches a first container 104a from an image file 110 by creating an initialization directory 106b for the first container 104a on a host filesystem 102. The initialization directory 106b can include a filesystem, such as a root filesystem for the container 104a. Launching the first container 104a can also include creating a first filesystem directory 106c for the first container 104a on the host filesystem 102. The first filesystem directory 106c can be different from the initialization directory 106b. Launching the first container 104a can also include mounting the initialization directory 106b to the first filesystem directory 106c.

In block 604, the computing device 100 launches a second container 104b from the image file 110 by creating a second filesystem directory 106d for the second container 104b on the host filesystem 102. The second filesystem directory 106d can be different from the initialization directory 106b and the first filesystem directory 106c. Launching the second container 104b can also include mounting the initialization directory 106b to the second filesystem directory 106d to enable the second container 104b to access the filesystem (e.g., of the initialization directory 106b).

Although the above examples have been described with respect to an init directory, other examples can be implemented using other directories. For example, another directory having data related to one or both of the containers 104a-b can be mounted to the filesystem directories 106c-d.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A non-transitory computer-readable medium comprising program code that is executable by a processing device for causing the processing device to launch a first container and a second container on a same host from a same image file, wherein launching the first container and the second container on the same host from the same image file involves:
   creating an initialization directory on the host, wherein the initialization directory includes a shareable filesystem;
   creating a first filesystem directory on the host, the first filesystem directory corresponding to the first container and being separate from the initialization directory;
   creating a second filesystem directory on the host, the second filesystem directory corresponding to the second container and being separate from the initialization directory;
   mounting the initialization directory to the first filesystem directory and to the second filesystem directory to enable the first container and the second container to access the shareable filesystem, wherein the shareable filesystem is a root filesystem for the first container and the second container; and
   executing the first container simultaneously with the second container on the host, the first container and the second container being configured to use the root filesystem concurrently with one another.

2. The non-transitory computer-readable medium of claim 1, wherein:
   the first container and the second container are read-only containers;
   mounting the initialization directory to the first filesystem directory includes read-only bind mounting the initialization directory to the first filesystem directory; and
   mounting the initialization directory to the second filesystem directory includes read-only bind mounting the initialization directory to the second filesystem directory.

3. The non-transitory computer-readable medium of claim 1, further comprising program code that is executable by the processing device for causing the processing device to:
   determine that the initialization directory exists on the host; and
   based on determining that the initialization directory exists on the host, launch the second container at least in part by mounting the initialization directory to the second filesystem directory.

4. The non-transitory computer-readable medium of claim 1, wherein the initialization directory comprises data other than the shareable filesystem for initializing the first container and the second container.

5. A system comprising:
   a processing device; and
   a memory device comprising instructions executable by the processing device for causing the processing device to launch at least two containers from a same image file on a same host such that the at least two containers are configured to share a filesystem, wherein launching the at least two containers from the same image file on the same host involves:
  creating an initialization directory on a host filesystem of the host, wherein the initialization directory includes the filesystem, wherein the filesystem is a root filesystem for a first container and a second container of the at least two containers;
  creating a first filesystem directory on the host filesystem, the first filesystem directory corresponding to the first container among the at least two containers and being separate from the initialization directory;
  creating a second filesystem directory on the host filesystem, the second filesystem directory corresponding to the second container among the at least two containers and being separate from the initialization directory;
  mounting the initialization directory to the first filesystem directory and to the second filesystem directory; and
  executing the first container simultaneously with the second container on the host, the first container and the second container being configured to use the root filesystem concurrently with one another.

6. The system of claim 5, wherein:
the first container and the second container are read-only containers;
mounting the initialization directory to the first filesystem directory includes read-only bind mounting the initialization directory to the first filesystem directory; and
mounting the initialization directory to the second filesystem directory includes read-only bind mounting the initialization directory to the second filesystem directory.

7. The system of claim 5, wherein the memory device further comprises instructions executable by the processing device for causing the processing device to:
  determine that the initialization directory exists on the host filesystem; and
  based on determining that the initialization directory exists on the host filesystem, launch the second container from the image file at least in part by mounting the initialization directory to the second filesystem directory.

8. The system of claim 5, wherein the memory device further comprises instructions executable by the processing device for causing the processing device to:
  based on launching the first container, update a record to reflect that the first container is using the initialization directory; and
  based on launching the second container, update the record to reflect that the second container is using the initialization directory.

9. A computer-implemented method comprising:
launching at least two containers on a same host from a same image file, wherein the at least two containers share a same initialization directory and a same root filesystem while the at least two containers are running on the same host, wherein launching the at least two containers on the same host involves:
  creating an initialization directory on a host filesystem of the host, wherein the initialization directory includes a root filesystem to be shared among the at least two containers;
  creating a first filesystem directory on the host filesystem, the first filesystem directory corresponding to a first container among the at least two containers and being separate from the initialization directory;
  creating a second filesystem directory on the host filesystem, the second filesystem directory corresponding to a second container among the at least two containers and being separate from the initialization directory;
  mounting the initialization directory to the first filesystem directory and to the second filesystem directory; and
  executing the at least two containers simultaneously on the host, wherein the at least two containers use the root filesystem concurrently with one another.

10. The method of claim 9, wherein:
the first container and the second container are read-only containers;
mounting the initialization directory to the first filesystem directory includes read-only bind mounting the initialization directory to the first filesystem directory; and
mounting the initialization directory to the second filesystem directory includes read-only bind mounting the initialization directory to the second filesystem directory.

11. The method of claim 9, further comprising:
determining that the initialization directory exists on the host filesystem; and
based on determining that the initialization directory exists on the host filesystem, launching the second container at least in part by mounting the initialization directory to the second filesystem directory.

12. The method of claim 9, further comprising:
based on launching the first container, updating a record to reflect that the first container is using the initialization directory; and
based on launching the second container, updating the record to reflect that the second container is using the initialization directory.

13. The method of claim 9, further comprising:
based on shutting down the first container, updating a record to reflect that the first container is not using the initialization directory; and
based on shutting down the second container, updating the record to reflect that the second container is not using the initialization directory.

14. The method of claim 9, wherein the initialization directory comprises data for initializing the first container.

15. The method of claim 9, further comprising:
prior to launching the second container:
  determining that the second container is to be launched from an image file; and
  determining that the second container is to be read-only; and
in response to determining that the second container is to be launched from the image file and that the second container is to be read-only, launching the second container.

16. The system of claim 5, wherein the memory device further comprises instructions executable by the processing device for causing the processing device to:
prior to launching the second container:
  determine that the second container is to be launched from the image file; and
  determine that the second container is to be read-only; and in response to determining that the second container is to be launched from the image file and that the second container is to be read-only, launch the second container.

17. The non-transitory computer-readable medium of claim 1, further comprising program code that is executable by the processing device for causing the processing device to:

prior to launching the second container:
  determine that the second container is to be launched from an image file; and
  determine that the second container is to be read-only; and
in response to determining that the second container is to be launched from the image file and that the second container is to be read-only, launch the second container.

\* \* \* \* \*